United States Patent
Mueller

(10) Patent No.: US 7,428,844 B2
(45) Date of Patent: Sep. 30, 2008

(54) PRESSURE SENSOR

(75) Inventor: Hans-Peter Mueller, Blitzenreute (DE)

(73) Assignee: ifm electronic GmbH, Essen (DE)

( * ) Notice: Subject to any disclaimer, the term of this patent is extended or adjusted under 35 U.S.C. 154(b) by 0 days.

(21) Appl. No.: 11/556,853

(22) Filed: Nov. 6, 2006

(65) Prior Publication Data
US 2007/0113659 A1 May 24, 2007

(30) Foreign Application Priority Data
Nov. 4, 2005 (DE) .................... 10 2005 053 062

(51) Int. Cl.
*G01F 7/00* (2006.01)
(52) U.S. Cl. ........................................ 73/714
(58) Field of Classification Search ............... 73/756, 73/715, 723, 718, 719, 720, 721, 724
See application file for complete search history.

(56) References Cited

U.S. PATENT DOCUMENTS

| | | | | |
|---|---|---|---|---|
| 5,535,629 A | * | 7/1996 | Gerdes et al. ............... | 73/756 |
| 6,698,294 B2 | * | 3/2004 | Jacob et al. ................ | 73/708 |
| 6,848,318 B2 | * | 2/2005 | Gerst et al. ................ | 73/715 |
| 7,040,174 B2 | * | 5/2006 | Mundry et al. ............ | 73/723 |

FOREIGN PATENT DOCUMENTS

| DE | 4416978 A1 | 11/1995 |
|---|---|---|
| DE | 19628551 A1 | 2/1997 |
| DE | 10221219 A1 | 12/2003 |

* cited by examiner

*Primary Examiner*—Jewel V Thompson
(74) *Attorney, Agent, or Firm*—David S. Safran

(57) ABSTRACT

A pressure sensor for static and/or dynamic pressure measurement of a liquid, flowable, or gaseous medium is described, with a housing (2) and with a pressure measuring cell (3), on the side facing the medium an opening (4) being formed through which one side (5) of the pressure measuring cell (3) is directly or indirectly in contact with the medium to be monitored, and the pressure measuring cell (3) converting the pressure to be monitored into a proportional measurement signal by means of an electromechanical converter.

The pressure sensor as claimed in the invention can have both a small outside diameter and can also be economically produced by the housing (2) sitting on the pressure measuring cell (3) and the housing (2) and the pressure measuring cell (3) being connected to one another on the face side so that the pressure measuring cell (3) is at least in part a component of the outer surface of the pressure sensor (1) and thus is not surrounded by the housing (2).

17 Claims, 11 Drawing Sheets

State of the art

PRESSURE SENSOR

BACKGROUND OF THE INVENTION

1. Field of the Invention

The invention relates to a pressure sensor for static and/or dynamic pressure measurement of a liquid, flowable, or gaseous medium, with a housing and with a pressure measuring cell, on the side facing the medium an opening being formed through which one side of the pressure measuring cell is in direct or indirect contact with the medium to be monitored, the pressure measuring cell converting the pressure to be monitored into a proportional measurement signal by means of an electromechanical converter.

2. Description of Related Art

Pressure sensors are used for monitoring and measuring the system pressure in hydraulic and pneumatic applications. Applications of these pressure sensors are for example hydraulic monitoring in machine tools, the plastics industry or the food industry, in which the pressure of various media, i.e. different liquids or gases, is monitored or measured. In this connection, depending on the application there are a host of different versions, the structure and design of the pressure sensors differing depending on the expected maximum nominal pressure of the medium to be monitored.

Known pressure sensors conventionally have a cylindrical pressure measuring cell which consists of a base body and a membrane which are held at a defined distance from one other and which are joined hermetically tight to one another by a connecting material, for example a brazing solder. In addition to pressure sensors in which the base body and the membrane are two inherently separate components, there are also pressure sensors which have a monolithic pressure measuring cell in which therefore the base body and the membrane are made in one piece. In addition, pressure sensors which are also often called fluid sensors generally have an electronic unit in which the measured values delivered by the pressure measuring cell are converted and optionally conditioned and evaluated. Moreover pressure sensors have an electric connection possibility for supply of the pressure sensor with the required energy and as the measurement signal and switching output.

Regardless of the specific configuration of the pressure measuring cell, it holds that the side of the membrane which is in contact with the medium to be monitored, in operation undergoes a deflection which is proportional to the pressure of the medium which can be detected by means of an electromechanical converter which is located on the other side of the membrane.

In the first type of pressure sensors, the measurement principle is the capacitive measurement principle (compare for example DE 44 16 978 C2 or DE 196 28 551 A1, corresponding to U.S. Pat. Nos. 5,824,909 & 5,892,156). The electrode-coated inside surfaces of the membrane and of the base body form a measurement capacitor with a capacitance which is dependent on the sagging of the membrane and thus is a measure of the pressure prevailing on the membrane. In practice, generally pressure measuring cells of ceramic are used, since ceramic pressure measuring cells have high measurement accuracy which remains stable over a very long time. On the side facing away from the membrane, the pressure measuring cell has an electronic circuit which converts the capacitance of the measurement capacitor into a pressure-dependent electrical signal and makes it accessible via electrical connecting lines for further processing or display.

In addition to these pressure sensors which have a capacitance measurement principle, in which the electromechanical converter is therefore two electrodes, there are also pressure sensors which have foil strain gauges (DMS) or pressure sensitive resistors or DMS resistors (for example, DE 102 21 219 A1). For these pressure sensors the DMS resistors are applied to the side of the membrane facing away from the medium, the resistance value of the DMS resistors depending on the sagging of the membrane and thus likewise being a measure of the pressure prevailing on the membrane.

In these pressure sensors or pressure measuring cells thus a separate base body which is located opposite the membrane is not necessary for measurement engineering purposes. There are therefore also pressure sensors or pressure measuring cells with DMS resistors in a monolithic embodiment in which the base body and the membrane are made in one piece. In this connection then the membrane is generally located on the side of the base body facing away from the medium, the base body having a blind hole in the area of the membrane. The base body thus has a pot shape, the bottom of the pot being formed by the membrane and the open side of the pot facing the medium. But in addition it is also possible for the membrane to be located on the side of the base body facing the medium. The pressure measuring cell is either likewise a ceramic measuring cell or a steel measuring cell, especially a high-grade steel measuring cell.

It is common to the known pressure sensors regardless of the specific configuration and the measurement principle which is implemented, that the pressure measuring cell is located in the housing such that it is completely surrounded by the housing or by the housing and a process connection which is connected to the housing. This process connection is used to connect the pressure sensor to a pipe or container which contains the medium to be monitored. If the pressure sensor does not have a separate process connection, the end of the housing facing the pipe or container is itself made as a process connection, for which on the housing then there is either an outside thread or an inside thread for connection to a corresponding coupler or for screwing into a corresponding hole in the pipe or container.

The dimensions, especially the diameter of the pressure sensor, depend on the diameter of the pressure measuring cell used, the outside diameter of the pressure sensor being distinctly larger than the diameter of the pressure measuring cell. If the diameter of the pressure sensor is to be reduced, it is thus first of all necessary to reduce the diameter of the pressure measuring cell which is generally cylindrical. This is achieved in the prior art in that instead of a conventional pressure measuring cell in thick film technology, a pressure measuring cell in thin film technology is used, i.e. a pressure measuring cell in which the electromagnetic converter, especially the DMS resistors are made not in thick film technique, but in thin film technique, and are applied to the measuring cell. In this way the diameter of the pressure measuring cell can be distinctly reduced, but the disadvantage is that the production costs for these pressure measuring cells in thin film technique are distinctly higher than the comparable pressure measuring cells in thick film technique.

SUMMARY OF THE INVENTION

Therefore the object of the invention is to make available the initially described pressure sensor with a size, especially its diameter, which has been reduced compared to conventional pressure sensors and thus can be installed in a space-saving manner and can be produced as economically as possible.

This object is achieved in the initially described pressure sensor in that the housing sits on the pressure measuring cell and the housing and the pressure measuring cell are connected to one another on the face side so that the pressure measuring cell is at least in part a component of the outer surface of the pressure sensor and thus is not surrounded by the housing. In contrast to the prior art, the pressure measuring cell is thus no longer surrounded by the housing, but is arranged relative to the housing such that the first face side of the pressure measuring cell facing away from the medium to be monitored is connected to the assigned face surface of the housing.

If the pressure sensor in accordance with the invention in addition to the housing also has a process connection, it is preferably provided that the pressure measuring cell and the process connection are likewise connected to one another on the face side. In this case the pressure measuring cell is seated on the process connection so that the pressure measuring cell is not surrounded radially either by the housing or by the process connection.

In accordance with the invention, it has thus been recognized that the encapsulation of the pressure measuring cell by the housing or the process connection which has always taken place in the prior art can be abandoned. This results in that the maximum outside diameter of the pressure sensor can correspond essentially to the outside diameter of the pressure measuring cell. As a result, a pressure sensor can thus be made available with an outside diameter which corresponds to that of a conventional pressure sensor with a pressure measuring cell in thin film technique, but which has a more favorable pressure measuring cell in thick film technique. Alternatively thereto, when using a pressure measuring cell in thin film technique, a pressure sensor can be implemented which has a much smaller outside diameter than conventional pressure sensors.

If the pressure sensor does not have an additional process connection, preferably the pressure measuring cell also functions as the process connection. In this case there is then on the pressure measuring cell a corresponding connection region for reliable and pressure-tight attachment of the pressure sensor in the opening or hole of a pipe or container. Preferably, for installation of the pressure sensor on the corresponding coupling on the pressure measuring cell a connection thread is formed, and the connection thread can be made both as an outside thread and also as an inside thread. The connection of the pressure measuring cell to the pipe or container which carries the medium to be monitored can however also take place differently than by screwing on or in. For example, on the pipe or on the container there can be corresponding snap, clamping or tensioning devices which ensure reliable and pressure-tight attachment of the pressure sensor in the opening of the pipe or container.

To achieve a relatively strong connection between the pressure measurement cell and the housing, the pressure measuring cell and the housing are preferably made of metal, the pressure measuring cell and the housing then being connected to one another by means of welding, especially by means of resistance welding, electron welding or laser welding. Alternatively, the connection also takes place between the pressure measuring cell and the housing by soldering, cementing, pressing or screwing. In this case it is of course also possible to combine several types of connections with one another, for example the pressure measuring cell and the housing can both be cemented to one another and also pressed onto one another.

The connection of the pressure measuring cell to the process connection which is generally of metal takes place preferably likewise by means of welding, especially by means of resistance welding, electron welding or laser welding. In this connection it is preferably provided that the face side of the process connection facing the pressure measuring cell has a so-called welding projection, by which welding of the pressure measuring cell and process connection is facilitated and the resulting connection becomes even more stable.

To securely connect the pressure sensor to a pipe carrying the medium to be monitored or a container containing the medium, at least two flat surfaces are formed on the pressure sensor. By attaching a corresponding tool to the flat surfaces then the pressure sensor and the process connection can be screwed into a coupling or into the pipe or the container or screwed onto a corresponding coupling.

As is conventional in the prior art, according to the first embodiment of the pressure sensor as claimed in the invention, on the process connection there is a corresponding mounting section with at least two flat surfaces, the mounting section preferably being made as a hexagon so that the mounting section then has six flat surfaces. Alternatively there can also be a mounting section with at least two flat surfaces on the pressure measuring cell, the mounting section then likewise having preferably the base of a hexagon. According to a last alternative the mounting section is made on the housing, then the housing having at least two flat surfaces. The last two alternatives are selected especially, but not exclusively when the pressure sensor does not have a separate process connection. In this case then the pressure measuring cell at the same time assumes the function of a process connection.

Even if it is fundamentally sufficient if either on the process connection, on the pressure measuring cell or on the housing a corresponding mounting section is made with at least two flat surfaces, it is of course also possible for there to be at the same time a corresponding mounting section on two or three components, i.e. on a process connection or on the housing or on the process connection and on the pressure measuring cell.

The pressure measuring cell of the pressure sensor as claimed in the invention, as described initially, can be made as a capacitive pressure measuring cell, especially as a capacitive ceramic measuring cell. But preferably it is however provided that the pressure measuring cell is a steel measuring cell, especially a high-grade steel measuring cell, which has foil strain gauges or DMS resistors made in thin film technique or thick film technique. Such a steel measuring cell is generally made as a monolithic pressure measuring cell, in which the base body and the membrane are made in one piece.

According to a last advantageous configuration which is to be briefly mentioned here, there is a decorative ring which at least partially surrounds the pressure measuring cell. The decorative ring can be made for example as a tension ring or shrinkdown plastic tubing and in addition to an optical effect, for example application of a company logo, it can also have an additional sealing function for the connecting site between the pressure measuring cell and the housing or the process connection.

In particular, there is a host of possibilities for embodying and developing the pressure sensor as claimed in the invention. In this respect reference is made to the claims which are subordinate to claim 1, and to the description of various embodiments in conjunction with the drawings.

DETAILED DESCRIPTION OF THE INVENTION

Figure 1:
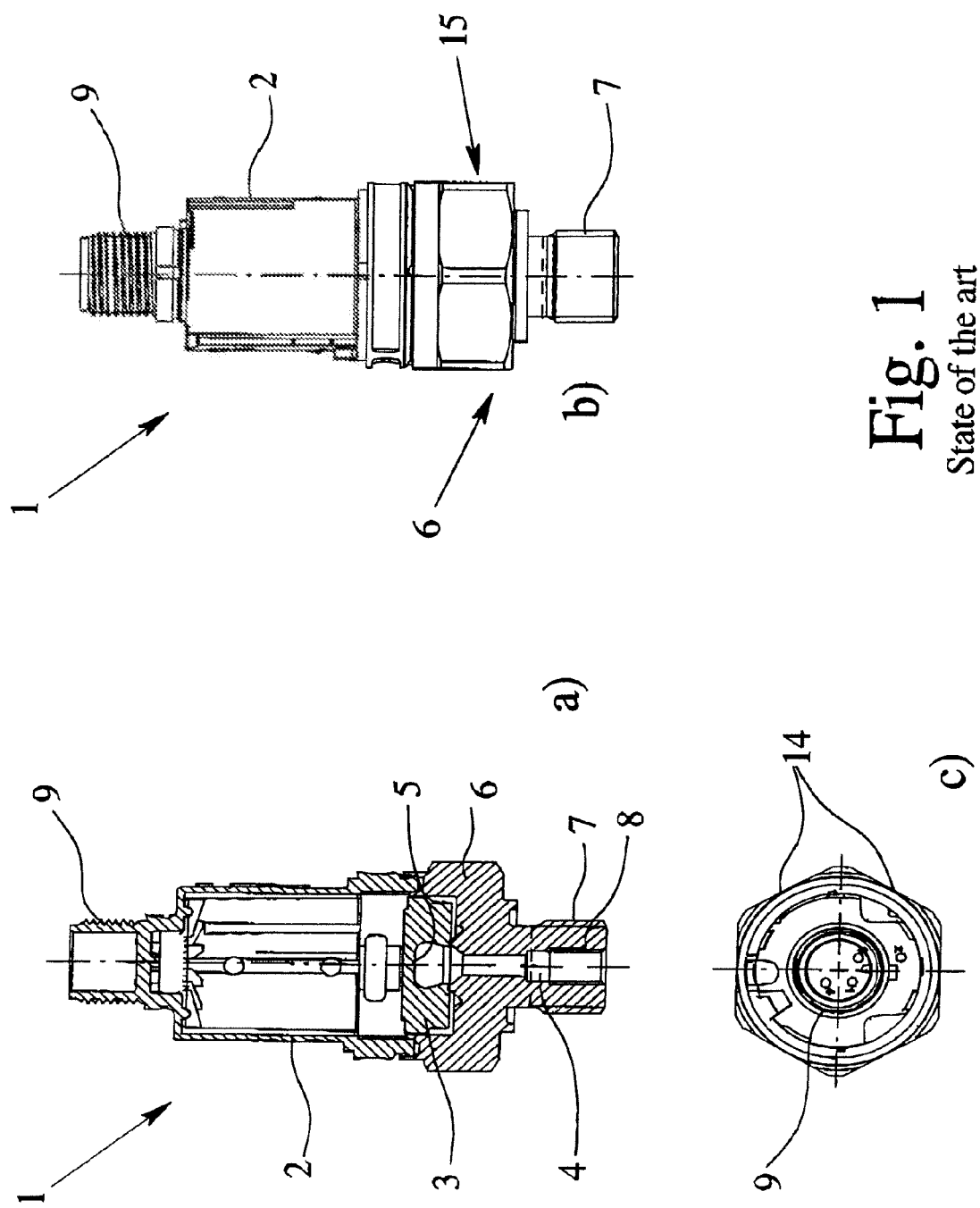
FIG. 1 shows one embodiment of the pressure sensor according to the prior art, as a section, as a side view, and as a top view.

FIGS. 1 to 9 shows different pressure sensors 1, FIG. 1 showing a pressure sensor 1 as in the prior art and FIGS. 2 to 9 showing different embodiments of the pressure sensor 1 in accordance with the invention. The pressure sensor 1, both according to the prior art (FIG. 1) and also according to the invention (FIGS. 2 to 9), has first of all a housing 2 and a pressure measuring cell 3, on the side facing the medium an opening 4 being formed by which one side 5 of the pressure measuring cell 3 is in contact with the medium to be monitored. In the cylindrical housing 2 is the electronics of the pressure sensor 1.

Figure 7:
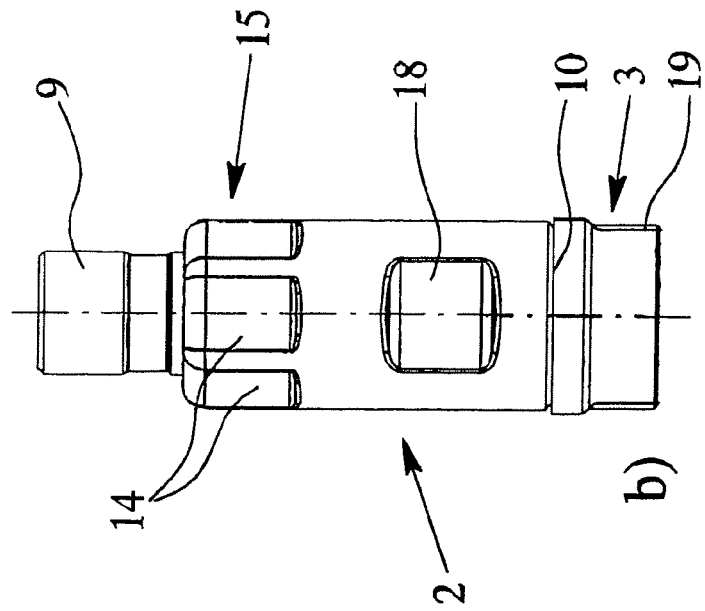
FIG. 7 shows a first embodiment of the pressure sensor as claimed in the invention without a separate process connection, as a section, as a side view, and as a top view.
Figure 7:
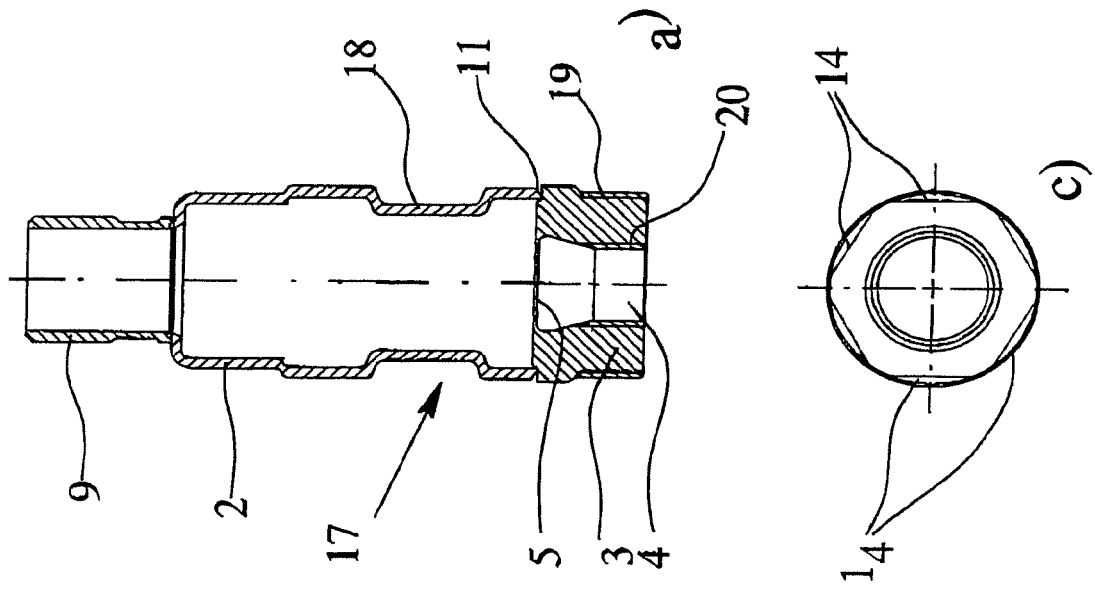
Figure 8:
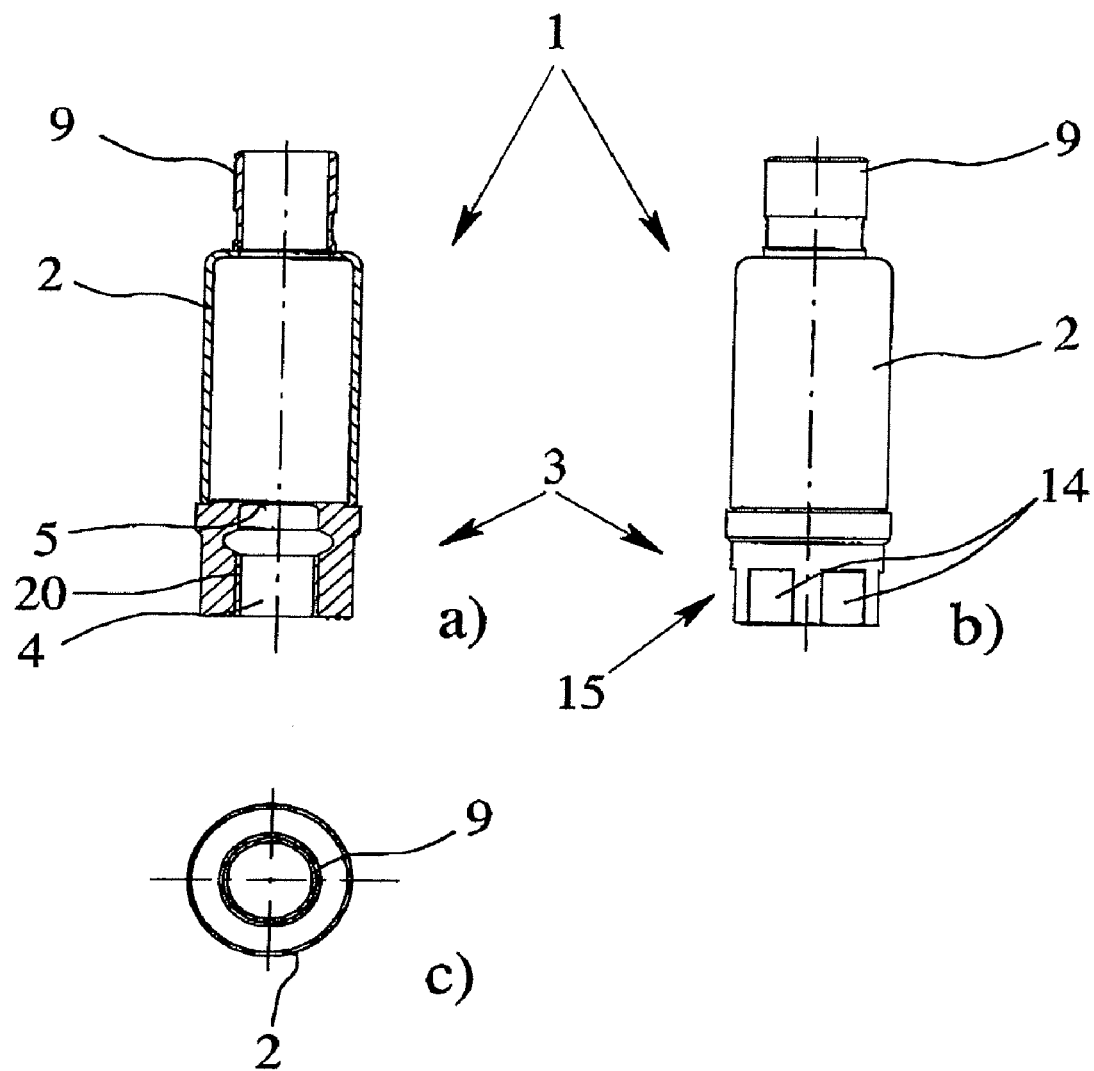
FIG. 8 shows a second embodiment of the pressure sensor as claimed in the invention without a separate process connection, as a section, as a side view, and as a top view.
Figure 9:
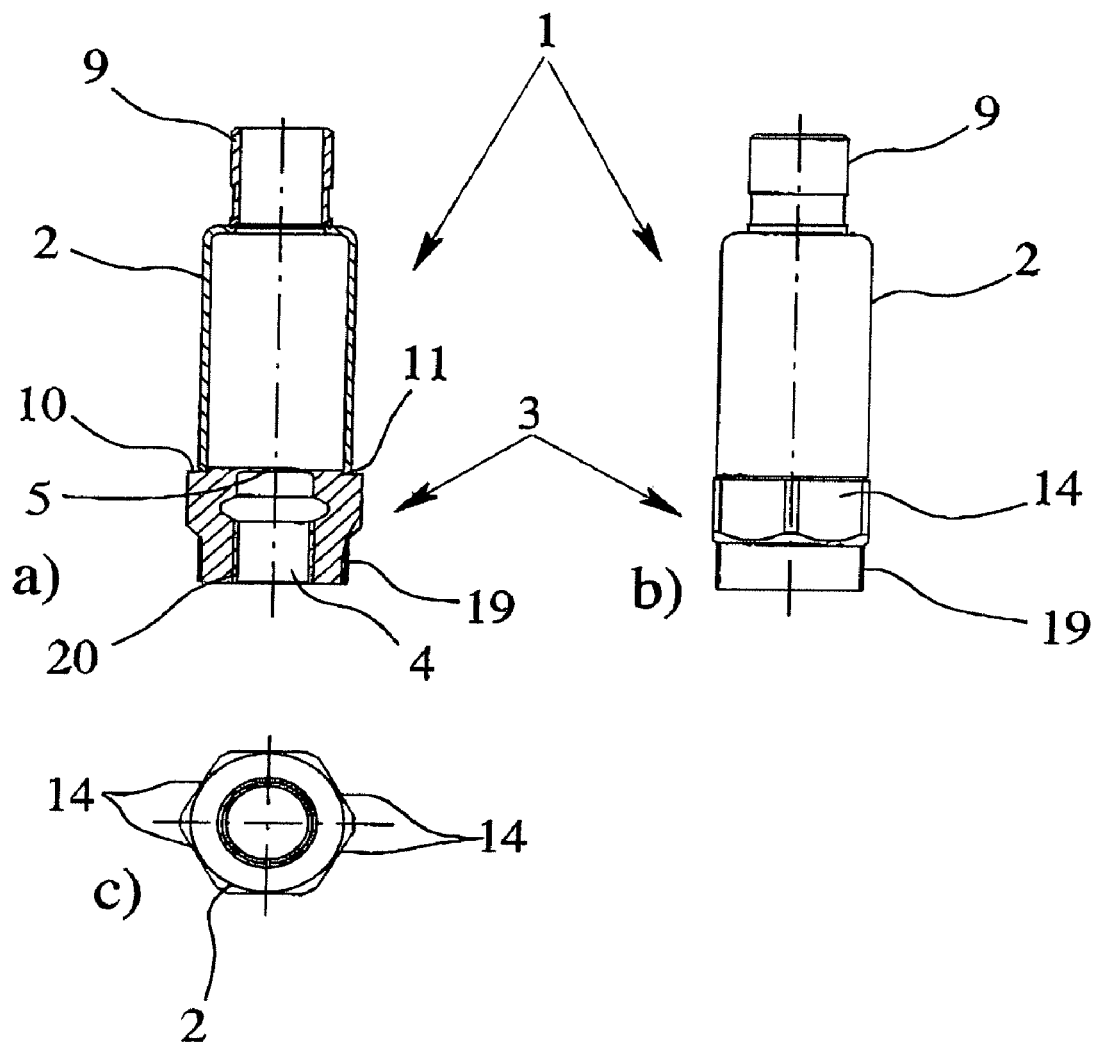
FIG. 9 shows a third embodiment of the pressure sensor as claimed in the invention without a separate process connection, as a section, as a side view, and as a top view.

With the exception of the pressure sensor 1 as shown in FIGS. 7 to 9, there is moreover a process connection 6 via which the pressure sensor 1 can be connected to the pipe or container which is not shown here and which carries the medium to be monitored. For this purpose the process connection 6 has an outside thread 7 so that the process connection 6 can be screwed into a hole of a container or a coupling. Moreover the process connection 6 also has an inside thread 8 so that the pressure sensor 1 can be selectively screwed onto the corresponding coupler using the process connection 6.

If the pressure sensor 1 in addition to the housing 2 and the pressure measuring cell 3 also has a process connection 6, the aforementioned opening 4 through which one side 5 of the pressure measuring cell 3 is in contact with the medium is formed in the process connection 6. Alternatively the housing 2 and the process connection 6 can also be made in one piece, so that then the region of the housing 2 facing the medium to be monitored is formed as the process connection. In this case then the opening 4 is made accordingly in the housing 2.

Finally, the pressure sensors 1 shown in the figures have an electrical connection possibility which is made as a plug connection 9. Instead of the plug connection 9 shown in the figures, of course there can also be a socket connection or an outgoing cable. The plug connection 9 can either be made in one piece with the housing 2 or can be connected to it for example by welding, pressing or crimping.

In the pressure sensor 1 shown in FIG. 1 in accordance with the invention the pressure measuring cell 3 is surrounded completely by the housing 2 and the process connection 6 which is securely connected to the housing 2. On the one hand, this leads to reliable encapsulation of the pressure measuring cell 3, but on the other also to the outside diameter of the pressure sensor 1 being distinctly larger than the outside diameter of the pressure measuring cell 3.

In contrast, in the pressure sensor 1 in accordance with the invention as shown in FIGS. 2 to 9, the housing 2 is placed on the pressure measuring cell 3, the housing 2 and the pressure measuring cell 3 being connected to one another on the face side, so that the pressure measuring cell 3 is part of the outer surface of the pressure sensor 1 and thus is not surrounded by the housing 2. As is apparent for example from FIG. 2a, the second face side 10 of the pressure measuring cell 3 facing away from the medium to be monitored is connected to the assigned face surface 11 of the housing 2, the connection taking place preferably by means of welding, especially by means of resistance welding.

In the embodiments of the pressure sensor 1 in accordance with the invention as shown in FIGS. 2 to 6, in which the pressure sensor 1 has a separate process connection 6, the pressure measuring cell 3 and the process connection 6 are also connected to one another on the face side. For this purpose the process connection 6 is placed on the pressure measuring cell 3 so that the pressure measuring cell 3 is surrounded radially neither by the housing 2 nor by the process connection 6.

If the housing 2, the pressure measuring cell 3 and the process connection 6 have roughly the same outside diameter, the outside diameter of the pressure sensor 1 corresponds essentially to the outside diameter of the pressure measuring cell 3. As a result, a clear reduction of the outside diameter of the pressure sensor 1 compared to the prior art is thus possible by the arrangement of the pressure measuring cell 3 as claimed in the invention between the housing 2 and the process connection 6, along the common middle axis 12 of the housing 2, the pressure measuring cell 3 and the process connection 6.

In the embodiments of the pressure sensor 1 shown in the figures, the pressure measuring cell 3 is made as a monolithic steel measuring cell, the connection between the pressure measuring cell 3 and the process connection taking place by the pressure measuring cell 3 and the metallic process connection 6 being welded to one another. For this purpose, on the face side of the process connection 6 facing the pressure measuring cell 3 a welding projection 13 is formed.

Figure 2:
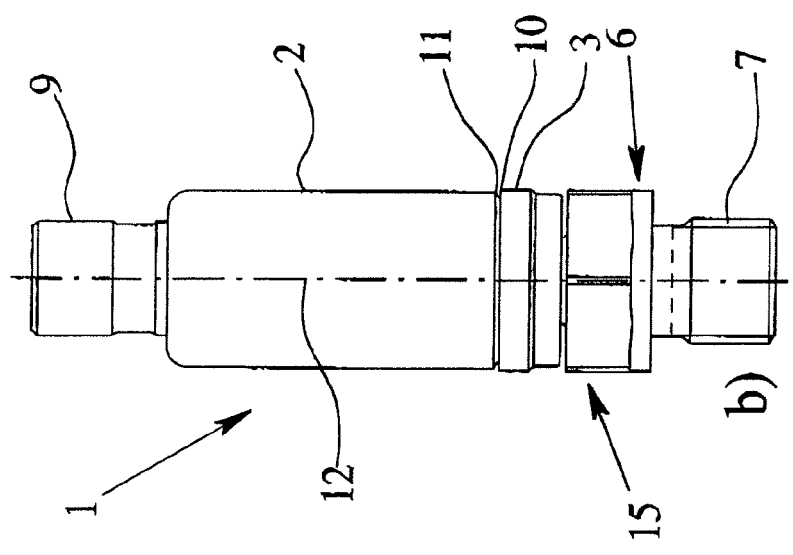
FIG. 2 shows a first embodiment of the pressure sensor as claimed in the invention, likewise as a section as a side view, and as a top view.
Figure 2:
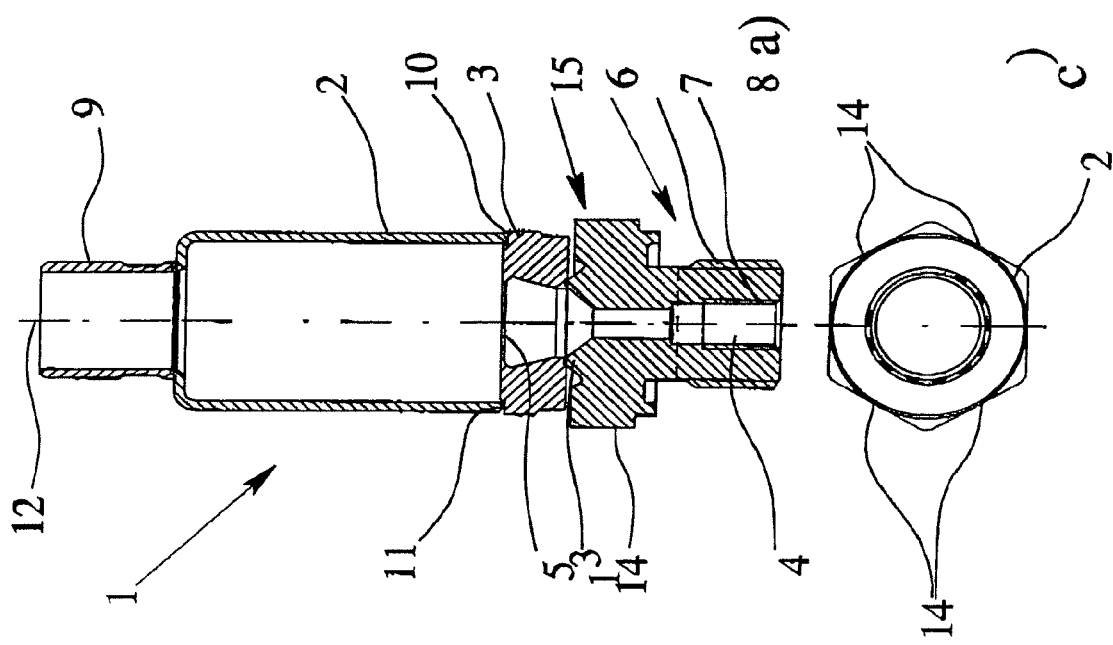
Figure 3:
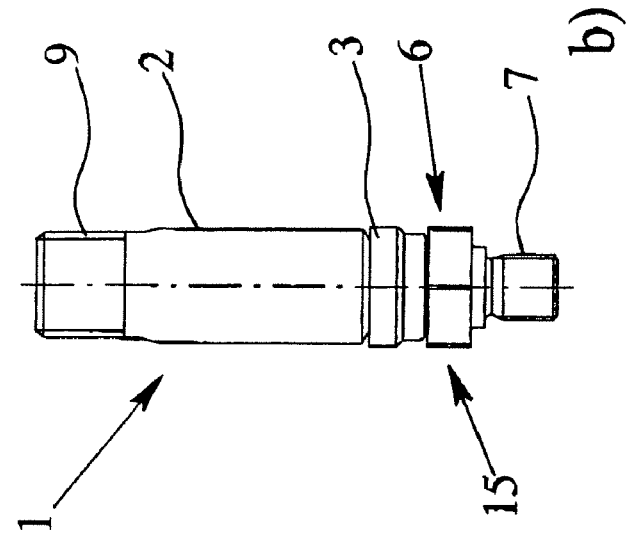
FIG. 3 shows another embodiment of a pressure sensor as claimed in the invention corresponding essentially to the embodiment shown in FIG. 2.
Figure 3:
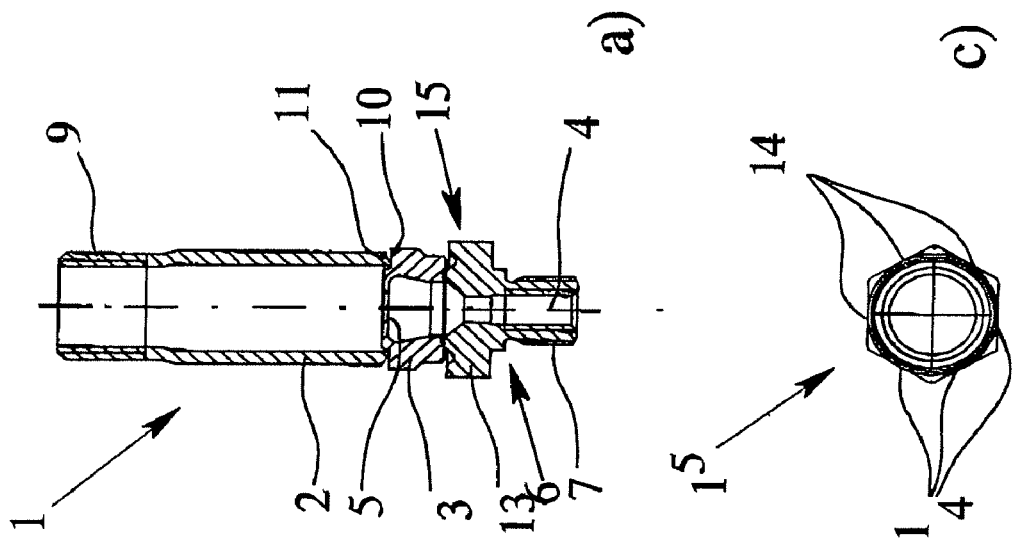

To securely join the pressure sensor 1 to a pipe or a container which carries the medium to be monitored, on the pressure sensor 1 at least two flat surfaces 14 are formed. In the embodiment according to FIGS. 2 to 4 there are flat surfaces 14—as in the prior art as shown in FIG. 1—on the process connection 6. For this purpose the process connection 6 has a mounting section 15 which has the base of a hexagon. In the two embodiments as shown in FIGS. 2 and 3 the mounting section 15 made as a hexagon has the largest outside diameter of the pressure sensor 1. To tighten the mounting section 15 thus both a corresponding open-jawed wrench as well as a socket wrench can be used which can be placed from overhead via the plug connection 9, the housing 2 and the pressure measuring cell 3 on the mounting section 15 made as a hexagon.

Figure 4:
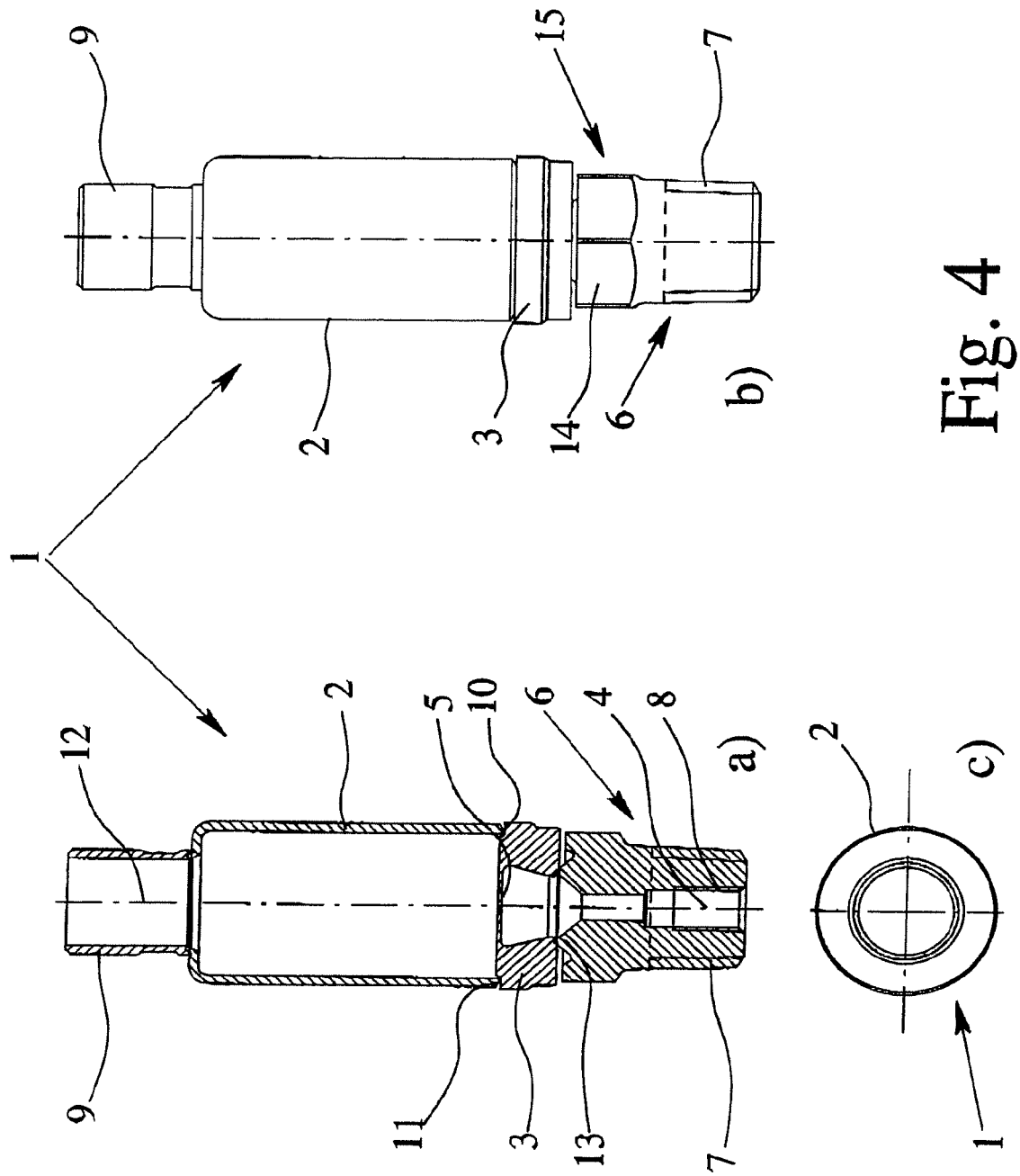
FIG. 4 shows a fundamentally second embodiment of the pressure sensor as claimed in the invention, as a section, as a side view, and as a top view.

In contrast thereto, in the embodiment as shown in FIG. 4 the mounting section 15 is likewise implemented on the process connection 6, but here the process connection 6 has a somewhat smaller diameter than the housing 2 and the pressure measuring cell 3. As is especially apparent from the top view as shown in FIG. 4c, here the mounting section 15 made as a hexagon is thus somewhat smaller than the outside diameter of the pressure measuring cell 3 so that the mounting section 15 in a top view is covered completely by the pressure measuring cell 3. In this version, compared to FIG. 2, a reduction of the maximum outside diameter of the pressure sensor 1 is thus possible. While in the specific embodiment as shown in FIG. 2 the wrench width of the hexagon is 19 mm, the wrench width of the mounting section 15 as shown in FIG. 4 is only 15 mm.

The embodiments as shown in FIGS. 2 and 3 differ essentially in that in the pressure sensor 1 as shown in FIG. 2 a pressure measuring cell 3 is used which is built in thick film technology, i.e. has conventional thick film DMS resistors 16. In contrast thereto, the pressure measuring cell 3 for the pressure sensor 1 as shown in FIG. 3 is produced in thin film technology so that the pressure measuring cell 3 has a clearly smaller outside diameter. In this way a pressure sensor 1 can be produced in which the mounting region 15 of the process connection 6 with a wrench width of 9 mm constitutes the maximum outside diameter.

Figure 5:
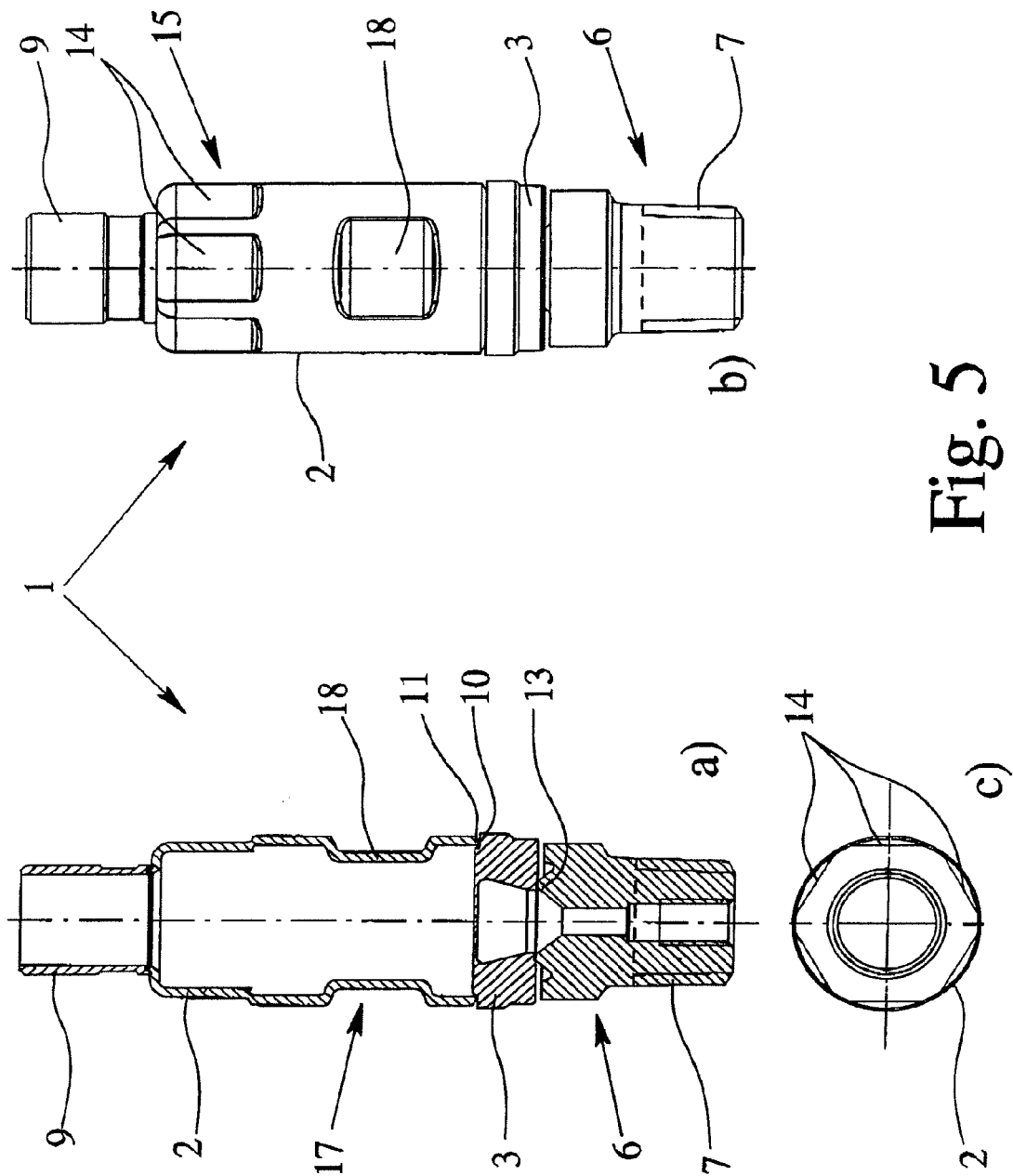
FIG. 5 shows another embodiment of the pressure sensor as claimed in the invention, as a section, as a side view, and as a top view.

In the pressure sensor 1 in accordance with the invention as shown in FIG. 5, the flat surfaces 14 are no longer made on the process connection 6, but now on the housing 2. In this connection the upper region of the housing 2, i.e., the region bordering the plug connection 9, is made as a first mounting section 15 which likewise has a base which corresponds to that of a hexagon. Thus, in this mounting area 15, the pressure sensor 1 can be screwed tight in turn using a socket wrench which is slipped over the plug connection 9 onto the mounting section 15. Moreover, the housing 2 in the middle area has another mounting section 17 in which two flat surfaces 18 are formed. The two flat surfaces 18 are used in this connection as working surfaces for the corresponding open-jawed wrench. Instead of forming two mounting sections 15 and 17 of course only one of the two mounting sections 15, 17 can also be implemented on the housing 2. As is apparent from FIG. 5c, the maximum outside diameter of the pressure sensor 1 corresponds to the outside diameter of the housing 2 and of the pressure measuring cell 3.

Figure 6:
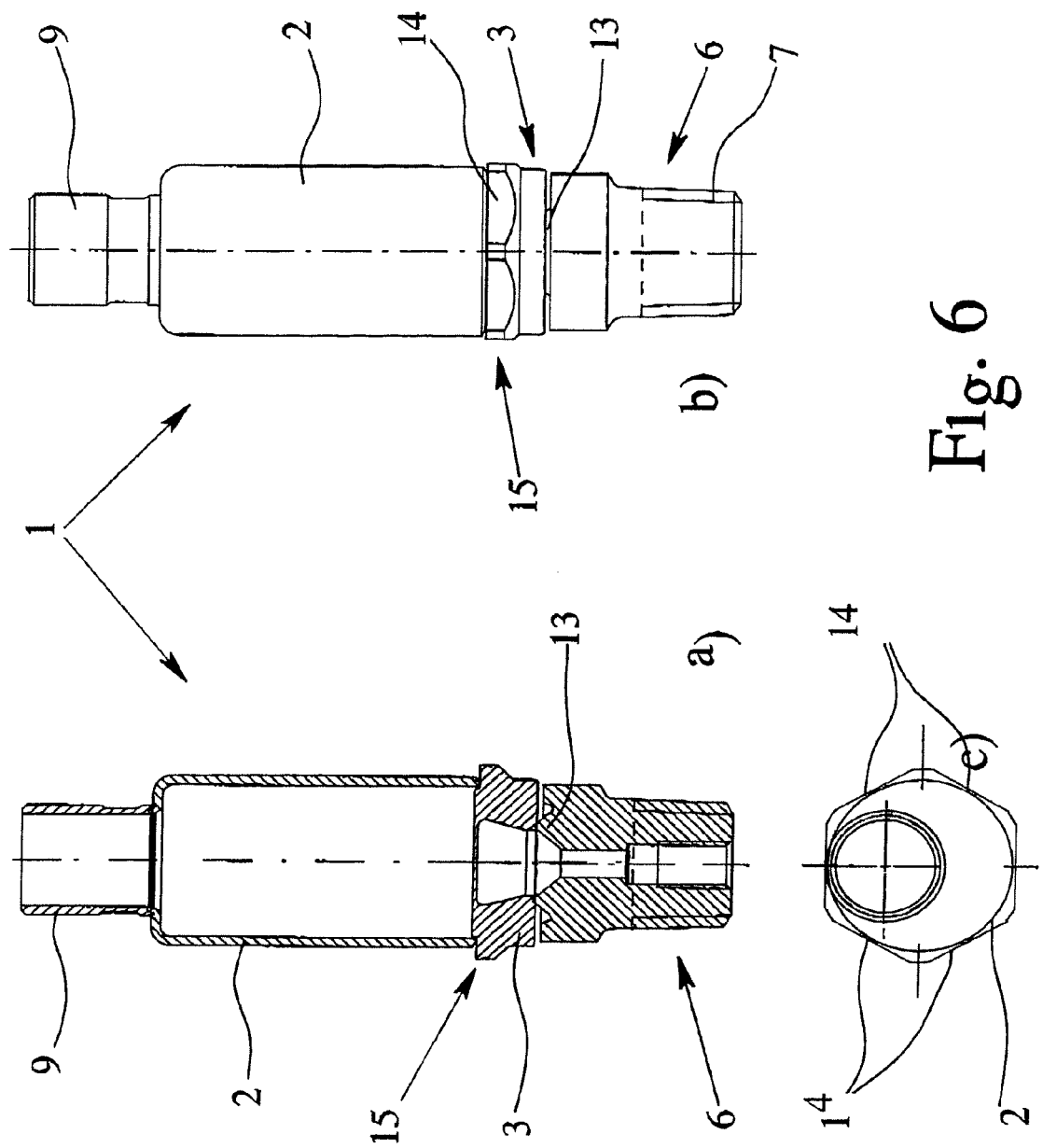
FIG. 6 shows a fourth embodiment of the pressure sensor as claimed in the invention, as a section, as a side view, and as a top view.

Finally, FIG. 6 shows a fundamentally third version of the arrangement of at least two flat surfaces 14 for mounting of the pressure sensor 1 in a coupling or a container hole, in this embodiment the flat surfaces 14 and thus the mounting area 15 being made on the pressure measuring cell 3. As in the other embodiments, the mounting section 15 here also has the base of a hexagon. Since the mounting section 15 on the pressure measuring cell 3 forms the area of the greatest outside diameter of the pressure sensor 1, a socket wrench or an open-jawed wrench can be selectively used for tightening.

Finally, FIGS. 7 to 9 show three embodiments of a pressure sensor 1 in which the pressure sensor 1 does not have a separate process connection 6. To mount the pressure sensor 1 on a corresponding coupling here, a connection thread is formed directly on the pressure measuring cell 3, and the connection thread can be made both as an outside thread 19 and also as an inside thread 20. Since in this embodiment of the pressure sensor 1 there is no process connection 6, the membrane of the pressure measuring cell 3 is in direct contact with the medium to be monitored via the opening 4 made in the pressure measuring cell 3. The pressure measuring cell 3 thus assumes in addition the function of the process connection, the process connection is thus an integral component of the pressure measuring cell 3.

In the pressure sensor 1 as shown in FIG. 7 the housing 2 according to the embodiment as shown in FIG. 5 has two mounting sections 15, 17. Alternatively, the flat surfaces 14 and thus the mounting section 15 however can also be made on the pressure measuring cell 3 as shown in FIGS. 8 and 9.

The embodiments as shown in FIGS. 8 and 9 differ essentially by the arrangement of the mounting section 15 or the flat surfaces 14 on the pressure measuring cell 3. While in the embodiments as shown in FIG. 8 the flat surfaces 14 are located on the bottom end of the pressure measuring cell 3, the flat surfaces 14 in the embodiments as shown in FIG. 9 are located on the area of the pressure measuring cell 3 near the housing 2. This difference is also apparent from the top view as shown in FIGS. 8c and 9c. In the pressure sensor 1 as shown in FIG. 8, the flat surfaces 14 are completely hidden by the housing 2 and by the upper region of the pressure measuring cell 3, while for the pressure sensor 1 as shown in FIG. 9 the flat surfaces 14 cover the connection area to the pressure measuring cell 3.

Figure 10:
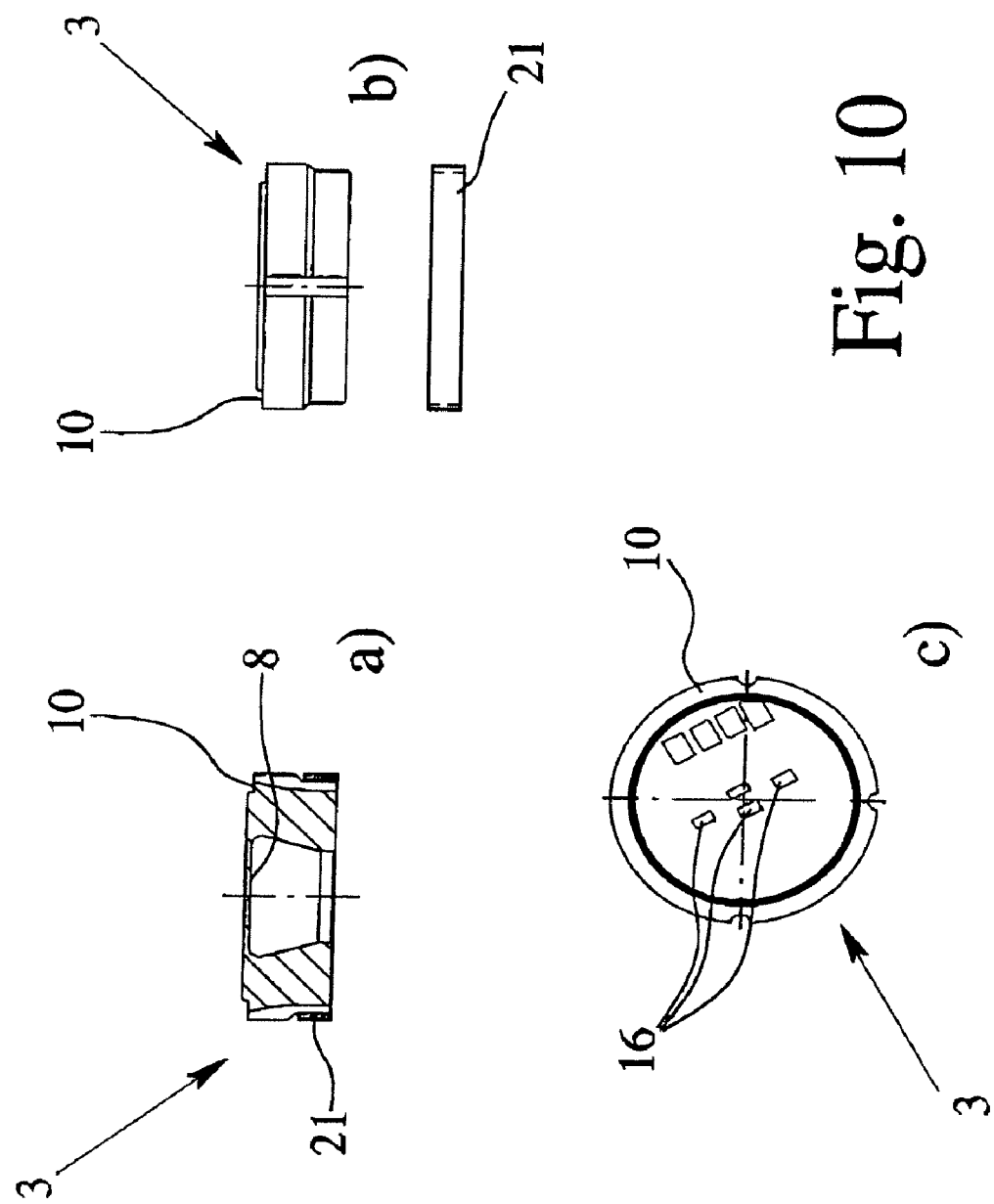
FIG. 10 shows a first embodiment of a pressure measuring cell for a pressure sensor as claimed in the invention as a section, as a side view, and as a top view.
Figure 11:
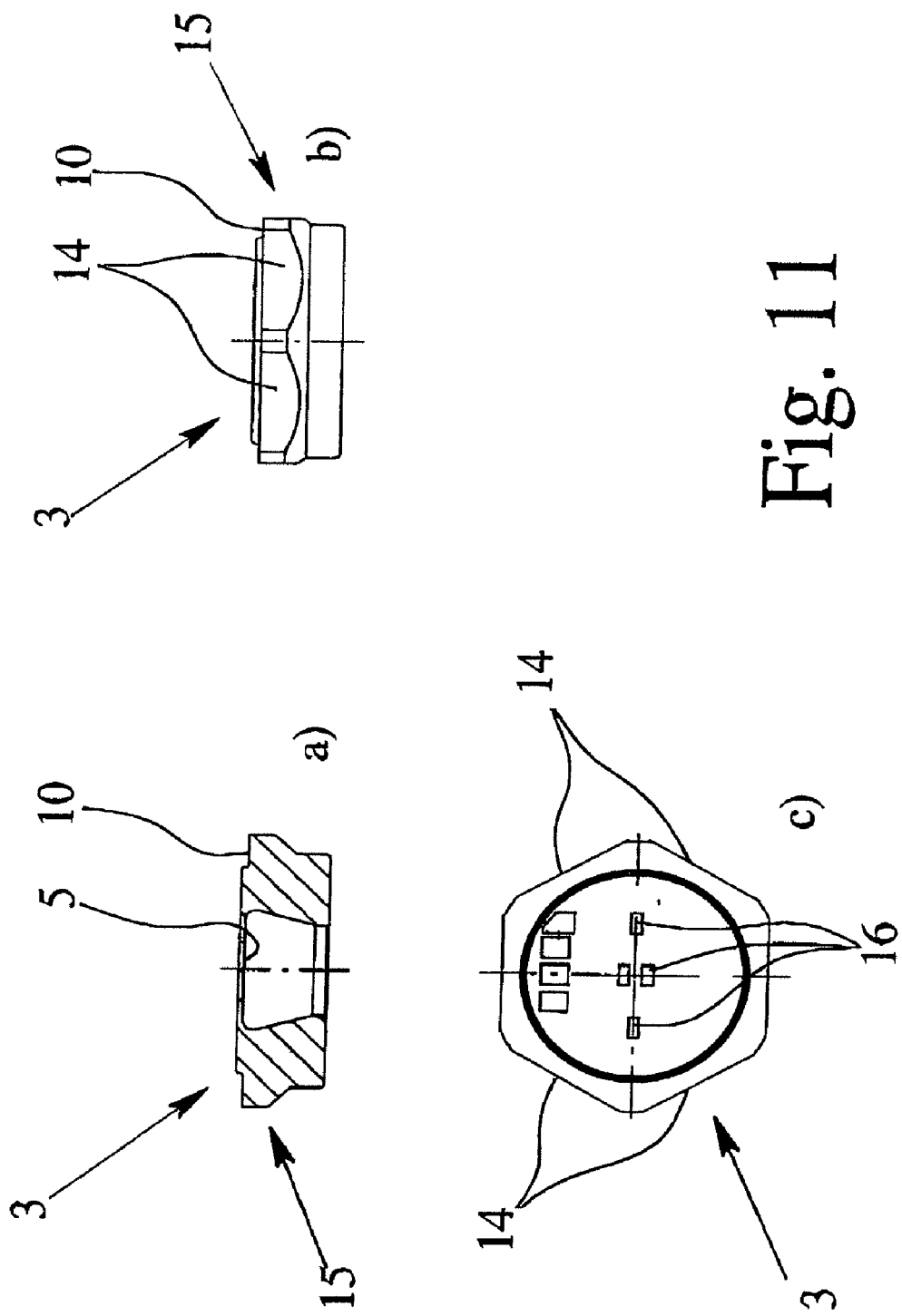
FIG. 11 shows a second embodiment of a pressure measuring cell as a section, as a side view, and as a top view.

FIGS. 10 and 11 finally show two embodiments of a pressure measuring cell 3, in the two embodiments the pressure measuring cell 3 being made as a monolithic steel measuring cell, in which DMS resistors 15 in thick film technology are applied to the side 10 facing away from the medium.

The pressure measuring cell 3 shown in FIG. 11 differs from the pressure measuring cell 3 shown in FIG. 10 in that for the pressure measuring cell 3 as shown in FIG. 11 a mounting section 15 is formed with a base surface which corresponds to a hexagon. The pressure measuring cell 3 as shown in FIG. 11 thus corresponds to the pressure measuring cell 3 which is used in the pressure sensor 1 as shown in FIG. 6. Conversely the pressure measuring cell 3 as shown in FIG. 10 has a cylindrical base body.

Finally, FIG. 10 shows that the area of the pressure measuring cell 3 bordering the process connection 6 is surrounded by a decorative ring 21. For this purpose the area of the pressure measuring cell 3 bordering the process connection 6 has a slightly smaller outside diameter so that the decorative ring 21 can be slipped onto this region. The decorative ring 21 can be used on the one hand as an identifying surface for the pressure sensor 1 by for example a company logo or device designation being attached to the decorative ring 21, on the other hand the decorative ring 21 can also assume an additional sealing function for the connecting site between the pressure measuring cell 3 and the process connection 6.

In one preferred embodiment of the pressure sensor 1 as claimed in the invention, the housing 2, the pressure measuring cell 3, the process connection 6, if present, and the plug connection 9 are made of metal, preferably steel or high-grade steel. The fixed connection between the pressure measuring cell 3 and the housing 2 on the one hand and optionally between the pressure measuring cell 3 and the process connection 6 on the other is produced by resistance welding. This connection is so stable that the pressures of more than 500 bar which occur in the process can be withstood. Preferably the plug connection 9 is also connected to the housing 2 by resistance welding so that the pressure sensor 1 is made altogether modular. In this way, if necessary in production simply different housings 2, with different lengths, difference process connections 6 with different connection regions or different electrical connection possibilities, a plug connection 9 or socket connection, can be connected to one another.

What is claimed is:

1. Pressure sensor for pressure measurement of a liquid, flowable, or gaseous medium, with a housing (2) containing electronics of the pressure sensor and with a pressure measuring cell (3), on the side of the pressure measuring cell (3) facing the medium, an opening (4) being formed through which one side (5) of the pressure measuring cell (3) is in contact with the medium to be monitored, the pressure measuring cell (3) converting the pressure to be monitored into a proportional measurement signal by means of an electromechanical converter, characterized in that an outer surface of the housing (2) sits on and is connected to a side of the pressure measuring cell which faces away from the medium to be monitored so that the pressure measuring cell (3) is at least in part a component of the outer surface of the pressure sensor (1) and thus is not surrounded by the housing (2).

2. Pressure sensor as claimed in claim 1, wherein the pressure measuring cell (3) has a connection region with an outside thread for reliable and pressure-tight attachment of the pressure sensor (1) in the opening or hole of a pipe or container.

3. Pressure sensor as claimed in claim 2, wherein the pressure measuring cell (3) for mounting the pressure sensor (1) has at least two flat surfaces (14), the pressure measuring cell (3) having a base with a peripheral surface in the shape of a hexagon.

4. Pressure sensor as claimed in claim 2, wherein the housing (2) and the pressure measuring cell (3) have roughly the same outside diameter.

5. Pressure sensor as claimed in claim 1, wherein there is a process connection (6), the pressure measuring cell (3) and the process connection (6) being connected to one another on the face side.

6. Pressure sensor as claimed in claim 5, wherein the housing (2), the pressure measuring cell (3) and the process connection (6) have roughly the same outside diameter.

7. Pressure sensor as claimed in claim 1, wherein the pressure measuring cell (3) is connected to the housing (2) by one of resistance welding, electron welding, laser welding, cementing, soldering, pressing, and screwing.

8. Pressure sensor as claimed in claim 5, wherein the pressure measuring cell (3) is connected to the process connection (6) by one of resistance welding, electron welding or laser welding.

9. Pressure sensor as claimed in claim 8, wherein the face side of the process connection (6) facing the pressure measuring cell (3) has a welding projection (13).

10. Pressure sensor as claimed in claim 5, wherein the process connection (6) has a mounting section (15) with at least two flat surfaces (14), the mounting section (15) being made as a hexagon.

11. Pressure sensor as claimed in claim 1, wherein the housing (2) has at least two flat surfaces (14, 18) for mounting a sensor (1).

12. Pressure sensor as claimed in claim 1, wherein on the side of the pressure measuring cell (3) facing away from the medium, foil strain gauges (DMS) or pressure sensitive resistors or strain gauges resistors (16) are attached, with a resistance value which depends on the sagging of the membrane of the pressure measuring cell (3).

13. Pressure sensor as claimed in claim 12, wherein the pressure measuring cell (3) is a steel measuring cell and the foil strain gauges (DMS) or strain gauges resistors (16) are produced in thin film technique or thick film technique.

14. Pressure sensor as claimed in claim 1, wherein the pressure measuring cell (3) is made as a capacitive pressure measuring cell (3) with a base body and a membrane.

15. Pressure sensor for pressure measurement of a liquid, flowable, or gaseous medium, with a housing (2) and with a pressure measuring cell (3), on the side of the pressure measuring cell (3) facing the medium an opening (4) being formed through which one side (5) of the pressure measuring cell (3) is in contact with the medium to be monitored, the pressure measuring cell (3) converting the pressure to be monitored into a proportional measurement signal by means of an electromechanical converter, characterized in that the housing (2) sits on the pressure measuring cell (3) and the housing (2) and the pressure measuring cell (3) are connected to one another on the face side, so that the pressure measuring cell (3) is at least in part a component of the outer surface of the pressure sensor (1) and thus is not surrounded by the housing (2) wherein the pressure measuring cell (3) is at least partially surrounded by a decorative ring (21), for example a tension ring or shrinkdown plastic tubing.

16. Pressure sensor as claimed in claim 15, wherein the decorative ring (21) encloses the region of the pressure measuring cell (3) bordering the process connection (6).

17. Pressure sensor as claimed in claim 1, wherein the housing (2) has a base cylindrical shape, which contains the electronics and on the side facing away from the pressure measuring cell (3) has an electrical connection.

* * * * *